US012732740B2

(12) United States Patent
Wen

(10) Patent No.: US 12,732,740 B2
(45) Date of Patent: Sep. 8, 2026

(54) NOISE REDUCTION ADJUSTING METHOD, EARPHONE AND COMPUTER-READABLE STORAGE MEDIUM

(71) Applicant: Goertek Technology Co., Ltd., Qingdao (CN)

(72) Inventor: Xiaofeng Wen, Shandong (CN)

(73) Assignee: Goertek Technology Co., Ltd., Qingdao (CN)

( * ) Notice: Subject to any disclaimer, the term of this patent is extended or adjusted under 35 U.S.C. 154(b) by 172 days.

(21) Appl. No.: 18/701,851

(22) PCT Filed: Dec. 23, 2021

(86) PCT No.: PCT/CN2021/140700
§ 371 (c)(1),
(2) Date: Apr. 16, 2024

(87) PCT Pub. No.: WO2023/070917
PCT Pub. Date: May 4, 2023

(65) Prior Publication Data

US 2024/0414470 A1 Dec. 12, 2024

(30) Foreign Application Priority Data

Oct. 28, 2021 (CN) ......................... 202111268121.0

(51) Int. Cl.
*H04R 1/10* (2026.01)
*G10K 11/178* (2006.01)

(52) U.S. Cl.
CPC ..... *H04R 1/1083* (2013.01); *G10K 11/17823* (2018.01); *G10K 2210/1081* (2013.01); *H04R 2460/01* (2013.01)

(58) Field of Classification Search
None
See application file for complete search history.

(56) References Cited

U.S. PATENT DOCUMENTS

2014/0177889 A1* 6/2014 Theill .................. H04R 25/453
381/317
2019/0385583 A1* 12/2019 Muggleton ...... G10K 11/17881
2021/0076146 A1* 3/2021 Naumann ............ H04R 25/505
2021/0151026 A1* 5/2021 Jain ..................... G10L 21/0208

FOREIGN PATENT DOCUMENTS

CN 105120389 A 12/2015
CN 109378012 A 2/2019
CN 111800704 A * 10/2020 ............... H04R 1/10

* cited by examiner

*Primary Examiner* — Qin Zhu
(74) *Attorney, Agent, or Firm* — Baker Botts, L.L.P.

(57) ABSTRACT

The present disclosure provides a noise reduction adjusting method, an earphone and a computer-readable storage medium. The noise reduction adjusting method comprises: acquiring a collected target noise value when an active noise reduction mode of an earphone is detected as activated; if the target noise value is greater than a standard hearing threshold corresponding to the target noise value, then outputting a sound signal with identical amplitude and opposite phase as compared with a noise corresponding to the target noise value, and calculating a difference between the target noise value and the standard hearing threshold; if the difference does not match with preset decibel intervals, then adjusting a noise reduction parameter of the earphone until an adjusted difference matches with the preset decibel intervals.

10 Claims, 2 Drawing Sheets

NOISE REDUCTION ADJUSTING METHOD, EARPHONE AND COMPUTER-READABLE STORAGE MEDIUM

CROSS-REFERENCE TO RELATED APPLICATIONS

The present disclosure is a National Stage of International Application No. PCT/CN2021/140700, which claims priority to a Chinese patent application No. 202111268121.0 filed with the CNIPA on Oct. 28, 2021 and entitled "NOISE REDUCTION ADJUSTING METHOD, EARPHONE AND COMPUTER-READABLE STORAGE MEDIUM", both of which are hereby incorporated by reference in their entireties.

TECHNICAL FIELD

The present disclosure relates to the field of an earphone, and particularly to a noise reduction adjusting method, an earphone and a computer-readable storage medium.

BACKGROUND

At present, commercially available earphones use a single noise reduction mode: the same mode is used to cancel the noise at low frequencies when active noise reduction is enabled, regardless of whether the user is in a quiet or noisy environment. An earphone of such a design has a different listening experience in the noisy environment from that in the quiet environment. In the quiet environment, if the low-frequency noise is further reduced, the user will have a feeling of negative pressure, resulting in an uncomfortable experience. In addition, since different users are of different sensitivities to different frequencies of sound and there may be differences between the left ear and the right ear, the product design is not compatible with different characteristics of users, making it difficult to achieve the noise reduction effect and experience that the users are satisfied with.

SUMMARY

An objective of the present disclosure is to provide a noise reduction adjusting method, an earphone and a computer-readable storage medium intended for solving the technical problem of how to improve the noise reduction effect of the earphone.

For achieving the above objective, the present disclosure provides a noise reduction adjusting method, comprising following steps:

acquiring a collected target noise value when it is detected that an earphone enables an active noise reduction mode thereof;

if the target noise value is greater than a standard hearing threshold corresponding to the target noise value, then outputting a sound signal with identical amplitude and opposite phase as compared with a noise corresponding to the target noise value, and calculating a difference between the target noise value and the standard hearing threshold;

if the difference does not match with a preset decibel interval, then adjusting the noise reduction parameter of the earphone until an adjusted difference matches with the preset decibel interval.

Optionally, the step of said "if the target noise value is greater than a standard hearing threshold corresponding to the target noise value, then outputting a sound signal with identical amplitude and opposite phase as compared with a noise corresponding to the target noise value" comprise:

determining a left ear noise value and a right ear noise value in the target noise value, and determining a left ear standard hearing threshold and a right ear standard hearing threshold in the standard hearing threshold;

comparing the left ear noise value with the left ear standard hearing threshold and the right ear noise value with the right ear standard hearing threshold, respectively, and outputting the sound signal with identical amplitude and opposite phase as compared with the noise corresponding to the target noise value according to a comparison result.

Optionally, a step of said "outputting the sound signal with identical amplitude and opposite phase as compared with the noise corresponding to the target noise value according to a comparison result" comprises:

if the left ear noise value is greater than the left ear standard hearing threshold and the right ear noise value is greater than the right ear standard hearing threshold, then outputting the sound signal with identical amplitude and opposite phase as compared with the noise corresponding to the target noise value to a left auditory canal and a right auditory canal corresponding to the earphone simultaneously.

Optionally, a step of said "outputting the sound signal with identical amplitude and opposite phase as compared with the noise corresponding to the target noise value according to a comparison result" comprises:

if the left ear noise value is greater than the left ear standard hearing threshold and the right ear noise value is lower than or equal to the right ear standard hearing threshold, then outputting the sound signal with identical amplitude and opposite phase as compared with the noise corresponding to the target noise value to a left auditory canal corresponding to the earphone.

Optionally, a step of said "outputting the sound signal with identical amplitude and opposite phase as compared with the noise corresponding to the target noise value according to a comparison result" comprises:

if the left ear noise value is lower than or equal to the left ear standard hearing threshold and the right ear noise value is greater than the right ear standard hearing threshold, then outputting the sound signal with identical amplitude and opposite phase as compared with the noise corresponding to the target noise value to a right auditory canal corresponding to the earphone.

Optionally, after a step of said "comparing the left ear noise value with the left ear standard hearing threshold and the right ear noise value with the right ear standard hearing threshold, respectively", comprising:

if the left ear noise value is lower than or equal to the left ear standard hearing threshold and the right ear noise value is lower than or equal to the right ear standard hearing threshold, then stopping a noise reduction process corresponding to the active noise reduction mode.

Optionally, a step of said "if the difference does not match with a preset decibel interval, then adjusting the noise reduction parameter of the earphone" comprises:

determining the minimum value in the preset decibel intervals and detecting whether the difference is less than the minimum value;

if the difference is smaller than the minimum value, then determining that the difference does not match with the preset decibel intervals, and adjusting the noise reduction parameter of the earphone.

Optionally, after a step of adjusting a noise reduction parameter of a noise reduction circuit in the earphone, comprises:

- if it is detected that the target noise value is updated, acquiring a noise value after updating; if the updated noise value is greater than an updated standard hearing threshold corresponding to the updated noise value, and a difference between the updated noise value and the updated standard hearing threshold does not match with the preset decibel intervals, then keeping the maximum noise reduction mode in the active noise reduction mode unchanged.

In addition, for solving the above objective, the present disclosure further provides an earphone, the earphone comprises a memory, a processor and a noise reduction adjusting program which is stored in the memory and is able to be run in the memory, and the noise reduction adjusting program, when executed by the processor, implements steps of the noise reduction adjusting method as described above.

In addition, for solving the above objective, the present disclosure further provides a computer-readable storage medium, the computer-readable storage medium stores a noise reduction adjusting program therein, and the noise reduction adjusting program, when executed by the processor, implements steps of the noise reduction adjusting method as described above.

In the present disclosure, if the acquired target noise value is greater than the standard hearing threshold when the earphone enables an active noise reduction mode thereof, outputting the sound signal with identical amplitude and opposite phase as compared with a noise corresponding to the target noise value so as to achieve the noise reduction effect, and in order to avoid the phenomenon of negative pressure caused by too low noise, adjusting the noise reduction parameter of the earphone when the difference between the target noise value and the standard hearing threshold does not match with the preset decibel intervals, until the adjusted difference matches with the preset decibel intervals, such that the noise reduction effect meets the need of the user. As such, the noise reduction effect is improved.

The realization of the objective, functional features and advantages of the present disclosure will be further explained with reference to the attached drawings in connection with the embodiment.

DETAILED DESCRIPTION

It should be understood that the specific embodiment described herein is merely illustrative of the present disclosure and is not intended to restrict the present disclosure.

Figure 1:
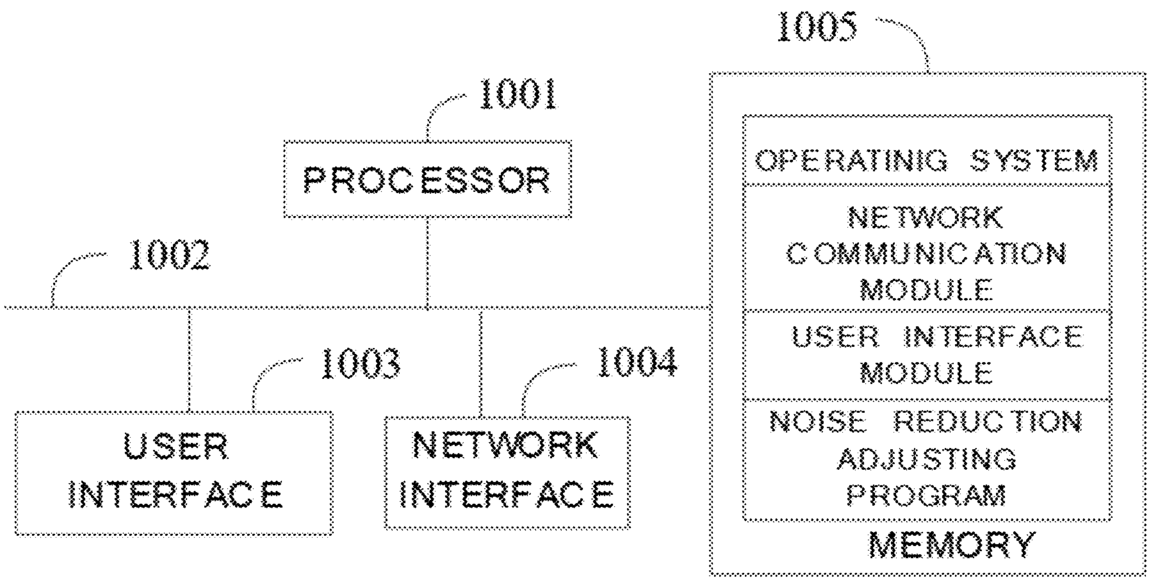
FIG. 1 is a schematic structural diagram of a terminal\device of a hardware operation environment involved in an embodiment of the present disclosure.

As shown in FIG. 1, FIG. 1 is a schematic structural diagram of a terminal\device of a hardware operation environment involved in an embodiment of the present disclosure.

The terminal in the embodiment of the present disclosure is an earphone.

As shown in FIG. 1, the terminal may comprise a processor 1001 such as a CPU, a network interface 1004, a user interface 1003, a memory 1005, and a communication bus 1002. Wherein, the communication bus 1002 is used to implement the communication between these components. The user interface 1003 may comprise a display, an input unit such as a keyboard, and optionally, the user interface 1003 may further comprise a standard wired interface, a wireless interface. The network interface 1004 may optionally comprise a standard wired interface, a wireless interface (e.g., a Wi-Fi interface). The memory 1005 may be a high-speed RAM memory or a stable memory (non-volatile memory), such as a disk memory. Optionally, the memory 1005 may also be a storage device independent of the above processor 1001.

Optionally, the terminal may also comprise a camera, a RF (Radio Frequency) circuitry, a sensor, an audio circuitry, WIFI modules, and the like; wherein, the sensors are, for example, light sensors, motion sensors, and other sensors. Specifically, the light sensor may comprise an ambient light sensor and a proximity sensor, wherein the ambient light sensor may adjust the brightness of the display according to the luminosity of the ambient light, and the proximity sensor may turn off the display and/or the backlight when the terminal device moves to the ear. Of course, the terminal device may also be configured with other sensors such as a gyroscope, a barometer, a hygrometer, a thermometer, an infrared sensor, and so on, which will not be repeated herein.

It will be appreciated by those skilled in the art that the terminal structure shown in FIG. 1 does not constitute a limitation to the terminal and may comprise more or fewer components than illustrated, or a combination of certain components, or a different arrangement of components.

As shown in FIG. 1, the memory 1005 as a computer storage medium may comprise an operating system, a network communication module, a user interface module, and a noise reduction adjusting program.

In the terminal shown in FIG. 1, the network interface 1004 is mainly used to connect to a background server and communicate with the background server; the user interface 1003 is mainly used to connect a client (the user side) and communicate with the client; the processor 1001 may be used to invoke the noise reduction adjusting program stored in memory 1005 and perform the following operations:

- acquiring a collected target noise value when it is detected that the earphone enables an active noise reduction mode thereof;
- if the target noise value is greater than a standard hearing threshold corresponding to the target noise value, then outputting a sound signal with identical amplitude and opposite phase as compared with a noise corresponding to the target noise value, and calculating a difference between the target noise value and the standard hearing threshold;
- if the difference does not match with a preset decibel interval, then adjusting the noise reduction parameter of the earphone until an adjusted difference matches with the preset decibel interval.

Figure 2:
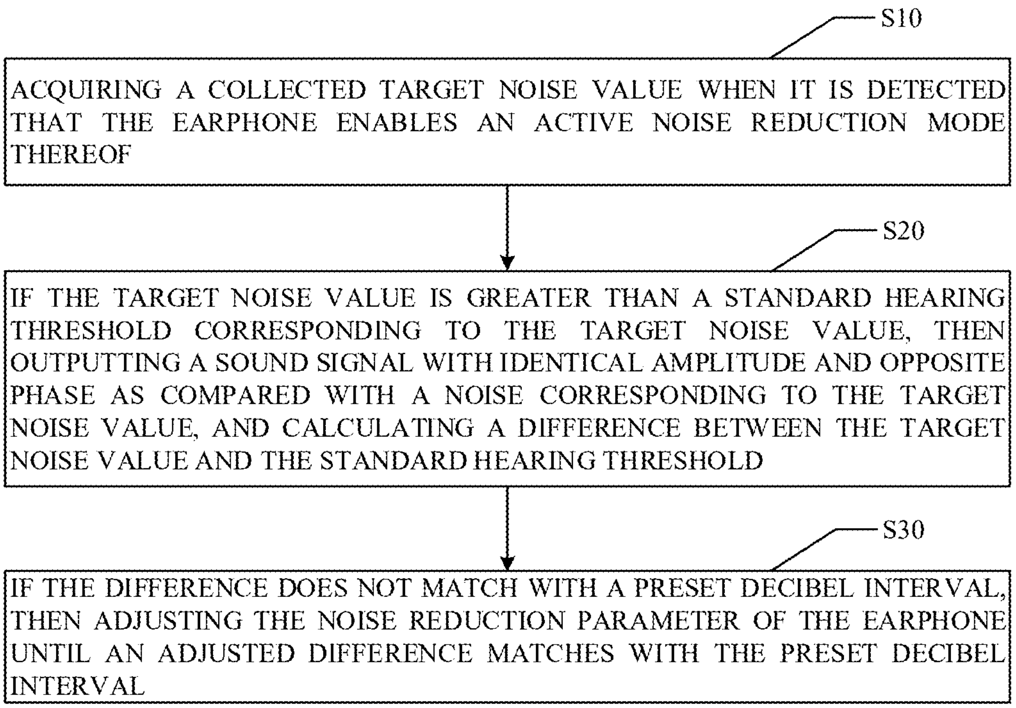
FIG. 2 is a flowchart of a noise reduction adjusting method according to a first embodiment of the present disclosure.

As shown in FIG. 2, the present disclosure provides a noise reduction adjusting method, and in a first embodiment of the noise reduction adjusting method, the noise reduction adjusting method comprises following steps:

Step S10, acquiring a collected target noise value when it is detected that the earphone enables an active noise reduction mode thereof;

The active noise reduction microphone picks up the noise in the external environment through the noise reduction speaker, and the sound wave generated by the noise reduction system with identical amplitude and opposite phase as compared with the external noise is played by a loudspeaker to cancel the sound signal of the external environment, thereby realizing the noise reduction effect. The active noise reduction comprises feed-forward noise reduction, feedback noise reduction, and hybrid noise reduction with both. Because the active noise reduction can effectively cancel low-frequency noise, and most of the noise in life is low-frequency noise, such as environmental noise in bus, subway, high-speed rail, train, car, bus, plane, gym, bar and other scenes, the active noise reduction is more and more popular with consumers. However, since it is difficult for current earphones to achieve the noise reduction effect and experience that the users are satisfied with, the present embodiment provides a noise reduction earphone that can adjust the noise reduction effect according to the in-ear noise and the user's hearing threshold, and is aimed at the fact that the noise reduction earphone corresponds to different users, but the response of the noise reduction circuit is the same design and cannot accommodate the needs of different users. In the present embodiment, the disclosure sets different responses of the noise reduction circuit according to the sensitivity of different users to the sound of different frequency bands and whether the sound entering the auditory canal is louder than the user's hearing threshold.

In the present embodiment, the noise reduction adjusting method is applied to the earphone, such as the noise reduction earphone. The noise reduction earphone comprises a loudspeaker for playing a signal, a feedback microphone located in the front chamber of the earphone for detecting residual noise in the auditory canal, and a control chip for signal processing, and optionally, further comprise a feed-forward microphone in the back cavity of the noise reduction earphone for picking up ambient noise. After being connected to a terminal (such as a mobile phone or a computer), the noise reduction earphone may test the user's hearing through an application (such as music) installed in the terminal.

Therefore, in the present embodiment, it is necessary to construct the standard hearing threshold corresponding to each frequency band first. That is, the connection between the noise reduction earphone and the terminal may be established through Bluetooth or wired transmission, and after entering into the hearing threshold detection mode, an application in the terminal may be used to control the loudspeaker in the noise reduction earphone to play sounds of different volumes and different frequency bands, so as to obtain the hearing threshold of the user in different frequency bands through testing. Testing results (including the testing results of the left ear and the right ear) are stored in the storage module of the control chip of the noise reduction earphone, and are defined as Threshold_L(f) and Threshold_R(f), wherein f represents different frequencies, the detection frequency band is 20 Hz to 2 kHz, L represents the left ear, R represents the right ear, that is, the left ear standard hearing threshold and the right ear standard hearing threshold. Further, in the present embodiment, the left ear standard hearing threshold and the right ear standard hearing threshold in the same frequency band and the same frequency may be used as the standard hearing thresholds.

In the present embodiment, when it is detected that the user uses the noise reduction earphone and the noise reduction earphone enables an active noise reduction mode thereof, the noise reduction module does not work at this time. The noise penetrating into the auditory canal through an earshield/earcap is first collected by the microphone of the noise reduction earphone, and then a spectrum analysis is carried out by an analysis module of the control chip to obtain the noise value of the noise which is taken as the target noise value. Besides, since the noise reduction earphone comprises a left earphone and a right earphone, the target noise value may comprise a left ear noise value and a right ear noise value.

Step S20: if the target noise value is greater than a standard hearing threshold corresponding to the target noise value, then outputting a sound signal with identical amplitude and opposite phase as compared with a noise corresponding to the target noise value, and calculating a difference between the target noise value and the standard hearing threshold;

In the present embodiment, when acquiring the target noise value, it is necessary to determine the corresponding standard hearing threshold according to the frequency band and frequency corresponding to the target noise value, such as the left ear standard hearing threshold corresponding to the left ear noise value and the right ear standard hearing threshold corresponding to the left ear noise value. Then, the target noise value and the standard hearing threshold corresponding to the target noise value are compared. If the target noise value is greater than the standard hearing threshold corresponding to the target noise value, and the noise corresponding to the target noise value is within the range of 20 Hz to 2 kHz, the control command sends an instruction, and the noise reduction module is enabled to enter into the noise reduction mode, and then outputting a sound signal with identical amplitude and opposite phase as compared with a noise corresponding to the target noise value by the loudspeaker to cancel the noise, thereby achieving the noise reduction effect. For example, when the user uses the earphone, if the active noise reduction mode is enabled, the noise reduction module does not work first, the feedback microphone collects the noise penetrating into the auditory canal through an earshield/earcap, and the spectrum analysis is carried out by the analysis module of the control chip to obtain FB_L(f) and FB_R(f). The judgment module performs a judgment, and if FB_L(f) is below Threshold_L(f) at 20 Hz to 2 kHz and FB_R(f) is below Threshold_R(f) at 20 Hz to 2 kHz, then the noise permeating into the left auditory canal and the right auditory canal is lower than the hearing threshold of the user, and the control module issues an instruction that there is no need to enable the noise reduction module for active noise reduction.

When the FB_i(f) of both or one of the left earphones and the right earphone is higher than Threshold_i(f), i=L or R, the control module sends a command, the noise reduction module is enabled to enter into the maximum noise reduction mode, and playing the signal with identical amplitude and opposite phase by the loudspeaker to cancel the noise signal.

Besides, in the present embodiment, in addition to playing through the loudspeaker to execute the noise reduction process, a comparison between the target noise value and the standard hearing threshold is made in real time, such as calculating the difference between the target noise value and the standard hearing threshold, and determining whether to adjust the noise reduction circuit according to the difference.

Step S30, if the difference does not match with preset decibel intervals, then adjusting the noise reduction parameter of the earphone until an adjusted difference matches with the preset decibel intervals.

In the present embodiment, since the target noise value is constantly compared with the standard hearing threshold when the noise corresponding to the target noise value is within 20 Hz to 2 kHz, the difference is compared with the minimum value of the preset decibel intervals (any decibel interval set by the user in advance, e.g. −3 dB-0 dB) after the difference is calculated. If the difference is smaller than the minimum value, then determining that the difference does not match with the preset decibel intervals, and at this time, the noise reduction parameter of the noise reduction circuit in the earphone may be adjusted, so that the difference calculated after adjustment matches with the preset decibel intervals; however, if they are not matched after the adjustment, then keeping the maximum noise reduction mode unchanged, so that the earphone guarantees the maximum noise reduction effect.

For example, When $FB\_i(f)-Threshold\_i(f)<-3$ dB, that is, when the target noise value-standard hearing threshold<−3 dB, it is determined that the difference and the preset decibel intervals do not match, and at this time, it is possible to adjust the noise reduction parameter of the noise reduction circuit in the earphone, such as adjusting the response Hb and Hf of the noise reduction circuit, so as to reduce the noise reduction effect until meeting $-3\ dB<FB\_i(f)-Threshold\_i(f)\leq 0$ dB, such that the residual noise in the auditory canal is not much different from $Threshold\_i(f)$ at 20 Hz to 2 kHz, thereby preventing the noise from being too low to make the user feel negative pressure. When the surrounding noise changes and $FB\_i(f)>Threshold\_i(f)$ appears, the noise reduction module is adjusted to enhance the noise reduction effect until $-3\ dB<FB\_i(f)-Threshold\_i(f)\leq 0$ dB is satisfied. If the noise reduction module still cannot satisfy $-3\ dB<FB\_i(f)-Threshold\_i(f)<=0$ dB when the noise adjusted to the maximum noise reduction mode, it remains at the maximum noise reduction effect. Wherein, Hb is the response of the feedback noise reduction circuit. Hf is the response of the feed-forward noise reduction circuit.

In the present embodiment, if the acquired target noise value is greater than the standard hearing threshold when the earphone enables the active noise reduction mode thereof, outputting the sound signal with identical amplitude and opposite phase as compared with a noise corresponding to the target noise value so as to achieve the noise reduction effect, and in order to avoid the phenomenon of negative pressure caused by too low noise, adjusting the noise reduction parameter of the earphone when the difference between the target noise value and the standard hearing threshold does not match with the preset decibel intervals, until the adjusted difference matches with the preset decibel intervals, such that the noise reduction effect meets the need of the user, therefore improving the noise reduction effect.

Further, based on the first embodiment of the above disclosure, a second embodiment of the noise reduction adjusting method of the present disclosure is provided. In the present embodiment, regarding the step S20 of the above embodiment, the refinement of the step "if the target noise value is greater than a standard hearing threshold corresponding to the target noise value, then outputting a sound signal with identical amplitude and opposite phase as compared with a noise corresponding to the target noise value" comprises:

Step a, determining a left ear noise value and a right ear noise value in the target noise value, and determining a left ear standard hearing threshold and a right ear standard hearing threshold in the standard hearing threshold;

In the present embodiment, when the target noise value of the noise is acquired and the noise is in the range of 20 Hz to 2 kHz, determining the noise value of the noise acquired by the left earphone first and taking it as the left ear noise value; and determining the noise value of the noise acquired by the right earphone and taking it as the right ear noise value. Then, determining a left ear standard hearing threshold in the storage module corresponding to the left ear noise value and determining a right ear standard hearing threshold in the storage module corresponding to the right ear noise value. The manner of determining the left ear standard hearing threshold or the right ear standard hearing threshold' may be by determining according to the frequency and the frequency band.

Step b, comparing the left ear noise value with the left ear standard hearing threshold and the right ear noise value with the right ear standard hearing threshold, respectively, and outputting the sound signal with identical amplitude and opposite phase as compared with the noise corresponding to the target noise value according to a comparison result.

When comparing the magnitude of the left ear noise value with the left ear standard hearing threshold and comparing the magnitude of the right ear noise value with the right ear standard hearing threshold, it can be determined by calculating the difference between the left ear noise value and the left ear standard hearing threshold, and calculating the difference between the right ear noise value and the right ear standard hearing threshold, or it is also possible to directly compare the values between the values. And, when comparing the left ear noise value with the left ear standard hearing threshold and comparing the right ear noise value with the right ear standard hearing threshold may be carried out simultaneously, or may be carried out sequentially according to rules set in advance, which is not limited herein. After the comparison results of the two comparisons are obtained, it is determined whether the output of a sound signal with identical amplitude and opposite phase as compared with the noise corresponding to the target noise value is determined.

In the present embodiment, by comparing the left ear noise value with the left ear standard hearing threshold and comparing the right ear noise value with the right ear standard hearing threshold to determine that the sound signal with identical amplitude and opposite phase as compared with the noise corresponding to the target noise value is output, the noise reduction effect of the earphone is guaranteed.

Specifically, a step of said "outputting the sound signal with identical amplitude and opposite phase as compared with the noise corresponding to the target noise value according to a comparison result" comprises:

if the left ear noise value is greater than the left ear standard hearing threshold and the right ear noise value is greater than the right ear standard hearing threshold, then outputting the sound signal with identical amplitude and opposite phase as compared with the noise corresponding to the target noise value to a left auditory canal and a right auditory canal corresponding to the earphone simultaneously.

By comparing the left ear noise value with the left ear standard hearing threshold and simultaneously comparing the right ear noise value with the right ear standard hearing threshold, if the left ear noise value is greater than the left ear standard hearing threshold and the right ear noise value is greater than the right ear standard hearing threshold, it can be determined that there is large noise in both the left auditory canal corresponding to the left earphone and the right auditory canal corresponding to the right earphone, and that the noise reduction process is required. At this time, the microphone in the left earphone may play the sound signal with identical amplitude and opposite phase as compared with the noise corresponding to the left ear noise value to the left auditory canal where the left earphone is located for cancellation, thereby achieving the noise reduction effect, and at the same time, the microphone in the right earphone may play the sound signal with identical amplitude and opposite phase as compared with the noise corresponding to the right ear noise value to the right auditory canal where the right earphone is located for cancellation, thereby achieving the noise reduction effect.

In the present embodiment, by simultaneously outputting sound signals with identical amplitude and opposite phase as compared with the noise corresponding to the target noise value to the left auditory canal and the right auditory canal corresponding to the earphone when it is determined that the left ear noise value is greater than the left ear standard hearing threshold and the right ear noise value is greater than the right ear standard hearing threshold, the noise reduction effect of the earphone is thus improved.

Specifically, a step of said "outputting the sound signal with identical amplitude and opposite phase as compared with the noise corresponding to the target noise value according to a comparison result" comprises:

Step c, if the left ear noise value is greater than the left ear standard hearing threshold and the right ear noise value is lower than or equal to the right ear standard hearing threshold, then outputting the sound signal with identical amplitude and opposite phase as compared with the noise corresponding to the target noise value to a left auditory canal corresponding to the earphone.

In the present embodiment, when comparing the left ear noise value with the left ear standard hearing threshold and simultaneously comparing the right ear noise value with the right ear standard hearing threshold, if it is found that the left ear noise value is greater than the left ear standard hearing threshold and the right ear noise value is less than or equal to the right ear standard hearing threshold, it may be determined that there is a large noise in the left auditory canal corresponding to the left earphone and the noise reduction process is required, and determined that there is no large noise in the right auditory canal corresponding to the right earphone and the noise reduction process is not required.

At this time, the microphone in the left earphone may play the sound signal with identical amplitude and opposite phase as compared with the noise corresponding to the left ear noise value to the left auditory canal where the left earphone is located for cancellation, thereby achieving the noise reduction effect. No other noise reduction process is performed on the right auditory canal where the right earphone is located.

In the present embodiment, by outputting sound signals with identical amplitude and opposite phase as compared with the noise corresponding to the target noise value to the left auditory canal corresponding to the earphone when it is determined that the left ear noise value is greater than the left ear standard hearing threshold and the right ear noise value is less than or equal to the right ear standard hearing threshold, the noise reduction effect of the earphone is thus improved.

Specifically, a step of said "outputting the sound signal with identical amplitude and opposite phase as compared with the noise corresponding to the target noise value according to a comparison result" comprises:

Step d, if the left ear noise value is lower than or equal to the left ear standard hearing threshold and the right ear noise value is greater than the right ear standard hearing threshold, then outputting the sound signal with identical amplitude and opposite phase as compared with the noise corresponding to the target noise value to a right auditory canal corresponding to the earphone.

In the present embodiment, when comparing the left ear noise value with the left ear standard hearing threshold and simultaneously comparing the right ear noise value with the right ear standard hearing threshold, if it is found that the left ear noise value is less than or equal to the left ear standard hearing threshold and the right ear noise value is greater than the right ear standard hearing threshold, it may be determined that there is a large noise in the right auditory canal corresponding to the right earphone and the noise reduction process is required, and determined that there is no large noise in the left auditory canal corresponding to the left earphone and the noise reduction process is not required.

At this time, the microphone in the right earphone may play the sound signal with identical amplitude and opposite phase as compared with the noise corresponding to the right ear noise value to the right auditory canal where the right earphone is located for cancellation, thereby achieving the noise reduction effect. No other noise reduction process is performed on the left auditory canal where the left earphone is located.

In the present embodiment, by outputting sound signals with identical amplitude and opposite phase as compared with the noise corresponding to the target noise value to the right auditory canal corresponding to the earphone when it is determined that the left ear noise value is less than or equal to the left ear standard hearing threshold and the right ear noise value is greater than the right ear standard hearing threshold, the noise reduction effect of the earphone is thus improved.

Specifically, after a step of said "comparing the left ear noise value with the left ear standard hearing threshold and the right ear noise value with the right ear standard hearing threshold, respectively", comprising:

Step e, if the left ear noise value is lower than or equal to the left ear standard hearing threshold and the right ear noise value is lower than or equal to the right ear standard hearing threshold, then stopping a noise reduction process corresponding to the active noise reduction mode.

In the present embodiment, when comparing the left ear noise value with the left ear standard hearing threshold and simultaneously comparing the right ear noise value with the right ear standard hearing threshold, if it is found that the left ear noise value is less than or equal to the left ear standard hearing threshold and the right ear noise value is less than or equal to the right ear standard hearing threshold, it may be determined that there is no large noise in the left auditory canal corresponding to the left earphone and in the right auditory canal corresponding to the right earphone, and that the noise reduction process is not required. That is, the noise reduction module is not enabled to perform the active noise reduction process.

In the present embodiment, when it is determined that the left ear noise value is less than or equal to the left ear standard hearing threshold and the right ear noise value is less than or equal to the right ear standard hearing threshold, the noise reduction process is stopped, thereby saving resources while ensuring the good sound playback effect of earphone.

Further, a step of said "if the difference does not match with preset decibel intervals, then adjusting the noise reduction parameter of the earphone" comprises:

determining the minimum value in the preset decibel intervals and detecting whether the difference is less than the minimum value;

Step f, determining the minimum value in the preset decibel intervals and detecting whether the difference is less than the minimum value;

In the present embodiment, after obtaining the difference between the left ear noise value and the left ear standard hearing threshold, or the difference between the right ear noise value and the right ear standard hearing threshold, it will be compared with the preset decibel intervals, that is, the minimum value in the preset decibel intervals is determined first, such as −3 dB. And then detecting whether all the differences are less than the minimum value so as to execute different operations according to different detection results.

Step g, if the difference is smaller than the minimum value, then determining that the difference does not match with the preset decibel intervals, and adjusting the noise reduction parameter of the earphone.

When a difference less than the minimum value is found after the judgment, it is determined that the difference and the preset decibel intervals are not matched. If the difference is the difference between the left ear noise value and the left ear standard hearing threshold, the noise reduction parameter of the noise reduction circuit where the left earphone is located needs to be adjusted so as to weaken the noise reduction effect. If the difference is the difference between the right ear noise value and the right ear standard hearing threshold, the noise reduction parameter of the noise reduction circuit where the right earphone is located needs to be adjusted so as to weaken the noise reduction effect.

In the present embodiment, by adjusting the noise reduction parameter of the earphone when the difference is lower than the minimum value of the preset decibel intervals, it is possible to prevent the noise from being too low to make the user feel negative pressure.

Specifically, after a step of adjusting a noise reduction parameter of a noise reduction circuit in the earphone, comprises:

Step h, if it is detected that the target noise value is updated, acquiring a noise value after updating; if the updated noise value is greater than an updated standard hearing threshold corresponding to the updated noise value, and a difference between the updated noise value and the updated standard hearing threshold does not match with the preset decibel intervals, then keeping the maximum noise reduction mode in the active noise reduction mode unchanged.

In the present embodiment, when a change in the surrounding noise is detected by the earphone and the acquired target noise value is updated, it is necessary to determine the noise value after updating and take it as the updated noise value, and when it is determined that the updated noise value is in the range of 20 Hz to 2 kHz of the frequency band, then determining the standard hearing threshold corresponding to the updated noise value in the storage module and taking it as the updated standard hearing threshold. It should be noted that the updated noise value may be a noise value after updating of the left ear noise value corresponding to the left earphone, or a noise value after updating of the right ear noise value corresponding to the right earphone, or a noise value after updating of the left ear noise value corresponding to the left earphone and a noise value after updating of the right ear noise value corresponding to the right earphone.

Then, comparing the updated noise value and the updated standard hearing threshold, if the updated noise value is greater than the updated standard hearing threshold, then adjusting the noise reduction module to enhance the noise reduction effect until the difference between the updated noise value and the updated standard hearing threshold matches with the preset decibel intervals. However, if the difference between the updated noise value and the updated standard hearing threshold is still not matched with the preset decibel intervals when the noise reduction module has been adjusted to the maximum noise reduction mode, then guaranteeing the maximum noise reduction effect.

In the present embodiment, by determining the updated noise value when it is determined that the target noise value is updated, and keeping the maximum noise reduction effect unchanged when the difference between the updated noise value and the updated standard hearing threshold does not match with the preset decibel intervals, the maximum noise reduction effect of the earphone is guaranteed.

Figure 3:
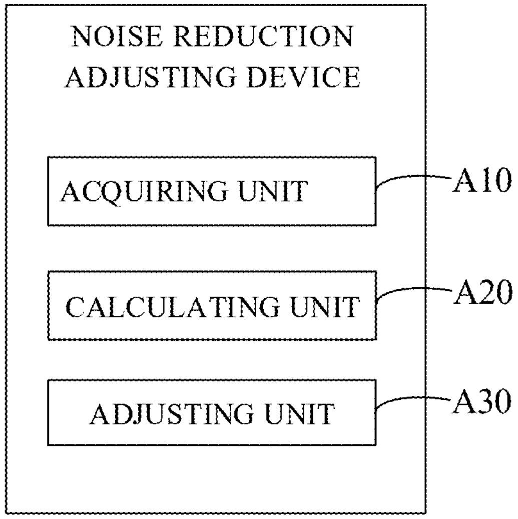
FIG. 3 is a schematic diagram of a device unit of the noise reduction adjusting device of the present disclosure.

In addition, please refer to FIG. 3, an embodiment of the present disclosure further provides a noise reduction adjusting device, comprising:

an acquiring unit A10 configured for acquiring a collected target noise value when it is detected that the earphone enables the active noise reduction mode thereof;

a calculating unit A20 configured for if the target noise value is greater than a standard hearing threshold corresponding to the target noise value, then outputting a sound signal with identical amplitude and opposite phase as compared with a noise corresponding to the target noise value, and calculating a difference between the target noise value and the standard hearing threshold;

an adjusting unit A30 configured for if the difference does not match with preset decibel intervals, then adjusting a noise reduction parameter of a noise reduction circuit in the earphone until an adjusted difference matches with the preset decibel intervals.

Optionally, the calculating unit A20 is configured for:

determining a left ear noise value and a right ear noise value in the target noise value, and determining a left ear standard hearing threshold and a right ear standard hearing threshold in the standard hearing threshold;

comparing the left ear noise value with the left ear standard hearing threshold and the right ear noise value with the right ear standard hearing threshold, respectively, and outputting the sound signal with identical amplitude and opposite phase as compared with the noise corresponding to the target noise value according to a comparison result.

Optionally, the calculating unit A20 is configured for:

if the left ear noise value is greater than the left ear standard hearing threshold and the right ear noise value is greater than the right ear standard hearing threshold, then outputting the sound signal with identical amplitude and opposite phase as compared with the noise corresponding to the target noise value to a left auditory canal and a right auditory canal corresponding to the earphone simultaneously.

Optionally, the calculating unit A20 is configured for:

if the left ear noise value is greater than the left ear standard hearing threshold and the right ear noise value is lower than or equal to the right ear standard hearing threshold, then outputting the sound signal with identical amplitude and opposite phase as compared with the noise corresponding to the target noise value to a left auditory canal corresponding to the earphone.

Optionally, the calculating unit A20 is configured for:

if the left ear noise value is lower than or equal to the left ear standard hearing threshold and the right ear noise value is greater than the right ear standard hearing threshold, then outputting the sound signal with identical amplitude and opposite phase as compared with the noise corresponding to the target noise value to a right auditory canal corresponding to the earphone.

Optionally, the calculating unit A20 is configured for:

if the left ear noise value is lower than or equal to the left ear standard hearing threshold and the right ear noise value is lower than or equal to the right ear standard hearing threshold, then stopping a noise reduction process corresponding to the active noise reduction mode.

Optionally, the calculating unit A30 is configured for:

determining the minimum value in the preset decibel intervals and detecting whether the difference is less than the minimum value;

if the difference is smaller than the minimum value, then determining that the difference does not match with the preset decibel intervals, and adjusting a noise reduction parameter of a noise reduction circuit in the earphone.

Optionally, the calculating unit A30 is configured for:

if it is detected that the target noise value is updated, acquiring a noise value after updating; if the updated noise value is greater than an updated standard hearing threshold corresponding to the updated noise value, and a difference between the updated noise value and the updated standard hearing threshold does not match with the preset decibel intervals, then keeping the maximum noise reduction mode in the active noise reduction mode unchanged.

Wherein, the steps implemented by various functional units of the noise reduction adjusting device may refer to various embodiments of the noise reduction adjusting method of the present disclosure, c.

In addition, the present disclosure further provides an earphone, comprising: a memory, a processor and a noise reduction adjusting program stored in the memory; the memory is configured for executing the noise reduction adjusting program so as to implement steps of embodiments of the above noise reduction adjusting method.

The present disclosure further provides a computer-readable storage medium storing one or more programs, and the one or more programs are also executable by one or more processors for implementing steps of embodiments of the above noise reduction adjusting method.

The specific implementation of the computer-readable storage medium of the present disclosure is basically the same as various embodiments of the above noise reduction adjusting method, which will not be further elaborated.

It should be noted that, in the present disclosure, the terms "including", "comprising", or any other variant thereof, are intended to cover non-exclusive inclusion, so that a process, method, article or system that includes a set of elements includes not only those elements, but also other elements that are not explicitly listed or that are inherent to such a process, method, article or system. In the absence of additional restrictions, an element qualified by the phrase "including a . . . " does not preclude the existence of other identical elements in the process, method, article or system that includes that element.

The serial numbers of the above-mentioned embodiments of the present disclosure are only for description, and do not represent the advantages or disadvantages of the embodiments.

Through the description of the above embodiments, those skilled in the art can clearly understand that the above embodiment method can be realized with the aid of software plus the necessary general hardware platform, or of course by means of hardware, but in many cases the former is the preferred embodiment. Based on this understanding, portions of the technical solutions of the present disclosure that are essential or contribute to the prior art may be embodied in the form of a software product. The computer software product is stored in a storage medium (such as ROM/RAM, a diskette, an optical disc) as described above, and comprises instructions for enabling a terminal device (which may be a mobile phone, a computer, a server, an air conditioner, or a network device, etc.) to perform the methods described in each embodiment of the present disclosure.

The above are only preferred embodiments of the present disclosure, and are not intended to limit the patent scope of the present disclosure, and all equivalent structural or equivalent process transformations made by using the contents of the description and drawings of the present disclosure, or directly or indirectly applied in other related technical fields, are similarly included in the patent protection scope of the present disclosure.

The invention claimed is:

1. A noise reduction adjusting method, comprising:

acquiring a collected target noise value when an active noise reduction mode of an earphone is detected as activated;

if the target noise value is greater than a standard hearing threshold corresponding to the target noise value, then outputting a sound signal with an identical amplitude and opposite phase as compared with a noise corresponding to the target noise value, and calculating a difference between the target noise value and the standard hearing threshold;

if the difference does not match with a preset decibel interval, then adjusting a noise reduction parameter of the earphone until an adjusted difference matches with the preset decibel interval.

2. The noise reduction adjusting method according to claim 1, wherein said "if the target noise value is greater than a standard hearing threshold corresponding to the target noise value, then outputting a sound signal with an identical amplitude and opposite phase as compared with a noise corresponding to the target noise value", comprises:

determining a left ear noise value and a right ear noise value in the target noise value, and determining a left ear standard hearing threshold and a right ear standard hearing threshold in the standard hearing threshold;

comparing the left ear noise value with the left ear standard hearing threshold and the right ear noise value with the right ear standard hearing threshold, respectively, and outputting the sound signal with an identical amplitude and opposite phase as compared with the noise corresponding to the target noise value according to a comparison result.

3. The noise reduction adjusting method according to claim 2, wherein said "outputting the sound signal with an identical amplitude and opposite phase as compared with the noise corresponding to the target noise value according to a comparison result", comprises:

if the left ear noise value is greater than the left ear standard hearing threshold and the right ear noise value is greater than the right ear standard hearing threshold, then outputting the sound signal with an identical amplitude and opposite phase as compared with the noise corresponding to the target noise value to a left auditory canal and a right auditory canal corresponding to the earphone simultaneously.

4. The noise reduction adjusting method according to claim 2, wherein said "outputting the sound signal with an identical amplitude and opposite phase as compared with the noise corresponding to the target noise value according to a comparison result", comprises:

if the left ear noise value is greater than the left ear standard hearing threshold and the right ear noise value is lower than or equal to the right ear standard hearing threshold, then outputting the sound signal with an identical amplitude and opposite phase as compared with the noise corresponding to the target noise value to a left auditory canal corresponding to the earphone.

5. The noise reduction adjusting method according to claim 2, wherein said "outputting the sound signal with an identical amplitude and opposite phase as compared with the noise corresponding to the target noise value according to a comparison result," comprises:

if the left ear noise value is lower than or equal to the left ear standard hearing threshold and the right ear noise value is greater than the right ear standard hearing threshold, then outputting the sound signal with an identical amplitude and opposite phase as compared with the noise corresponding to the target noise value to a right auditory canal corresponding to the earphone.

6. The noise reduction adjusting method according to claim 2, wherein after said "comparing the left ear noise value with the left ear standard hearing threshold and the right ear noise value with the right ear standard hearing threshold, respectively", comprising:

if the left ear noise value is lower than or equal to the left ear standard hearing threshold and the right ear noise value is lower than or equal to the right ear standard hearing threshold, then stopping a noise reduction process corresponding to the active noise reduction mode.

7. The noise reduction adjusting method according to claim 1, wherein said "if the difference does not match with a preset decibel interval, then adjusting the noise reduction parameter of the earphone," comprises:

determining the minimum value in the preset decibel intervals and detecting whether the difference is less than the minimum value;

if the difference is smaller than the minimum value, then determining that the difference does not match with the preset decibel interval, and adjusting the noise reduction parameter of the earphone.

8. The noise reduction adjusting method according to claim 7, wherein after adjusting a noise reduction parameter of a noise reduction circuit in the earphone, comprises:

if it is detected that the target noise value is updated, acquiring an updated noise value after updating; if the updated noise value is greater than an updated standard hearing threshold corresponding to the updated noise value, and a difference between the updated noise value and the updated standard hearing threshold does not match with the preset decibel intervals, then keeping the maximum noise reduction mode in the activated noise reduction mode unchanged.

9. An earphone, wherein the earphone comprises a memory, a processor, and a noise reduction adjusting program stored in the memory and is adaptable to be run in the memory, and the noise reduction adjusting program is configured for execution by the processor to implement a noise reduction adjusting method according to claim 1.

10. A computer-readable storage medium, wherein the computer-readable storage medium stores a noise reduction adjusting program therein, and the noise reduction adjusting program is configured for execution by the processor to implement a noise reduction adjusting method according to claim 1.

* * * * *